Jan. 30, 1934.  R. C. BALL  1,945,361
MOTOR SPEED REDUCER
Filed Nov. 11, 1932  3 Sheets-Sheet 1

INVENTOR
RUSSELL C. BALL
BY
ATTORNEY

Jan. 30, 1934.    R. C. BALL    1,945,361
MOTOR SPEED REDUCER
Filed Nov. 11, 1932    3 Sheets-Sheet 2
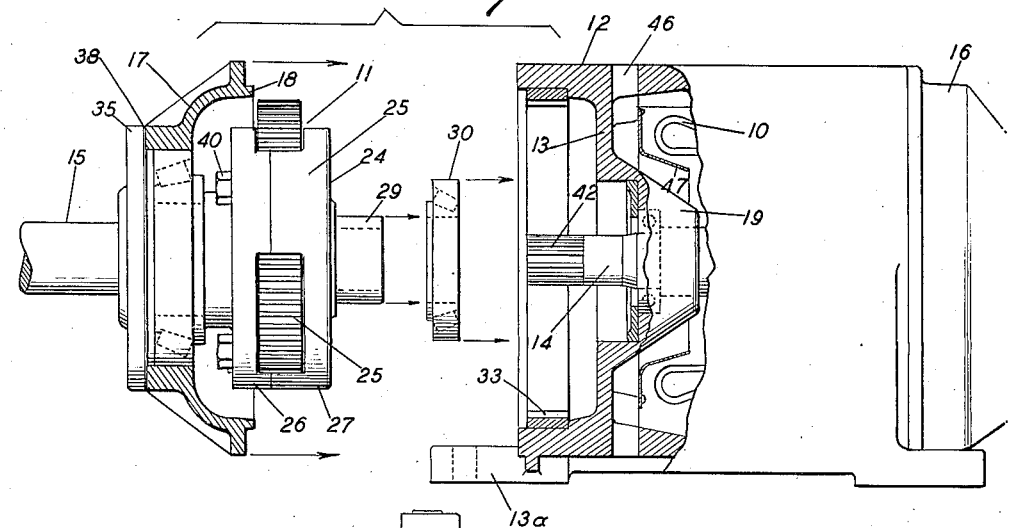
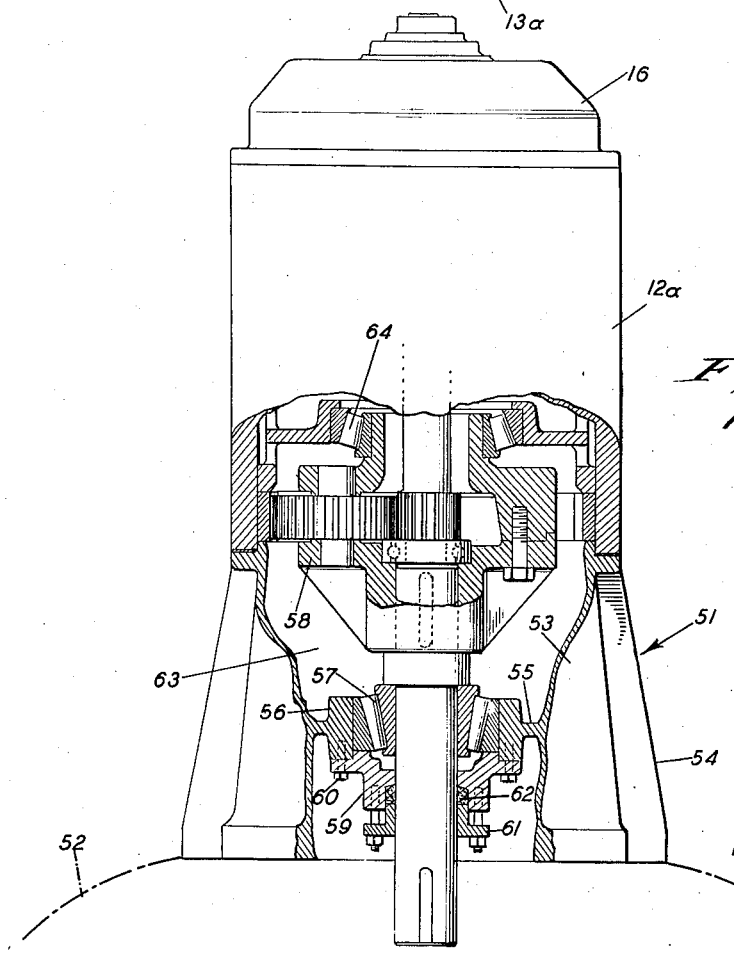
INVENTOR
RUSSELL C. BALL
ATTORNEY.

Jan. 30, 1934.  R. C. BALL  1,945,361
MOTOR SPEED REDUCER
Filed Nov. 11, 1932  3 Sheets-Sheet 3

INVENTOR
RUSSELL C. BALL
BY
ATTORNEY

Patented Jan. 30, 1934

1,945,361

UNITED STATES PATENT OFFICE 1,945,361

MOTOR SPEED REDUCER

Russell C. Ball, Philadelphia, Pa.

Application November 11, 1932
Serial No. 642,155

4 Claims. (Cl. 74—34)

This invention relates to speed reduction gearing of the planetary type in which a primary or drive shaft operates through the medium of surrounding planetary gears upon a secondary or driven shaft which is coaxial with the driving shaft. More particularly this invention relates to novel arrangements in a drive unit comprising an electro-motor having coaxially arranged therewith, a reduction gearing of the planetary type. The object of this invention is to produce a unit of great compactness; stability of mounting in view of mechanical stresses; accessibility of the component parts of the unit; simplicity and cheapness, durability, and a more universal range of application.

This invention therefore can be said to comprise structural measures which produce manifold and cumulative advantages of manufacture and operation. That is, a unit embodying this invention, is entirely self-sustained, and has inherent to its design the important advantage of wide bases to take up exterior forces exerted upon the stub or secondary shaft axially projecting from said unit, whereby in particular the possibility of undesirable or undue vibrations in the unit is avoided or reduced, all in spite of the fact that with regard to its axial length, the machine is compacted to a minimum.

Such a unit furthermore, readily lends itself to mounting in horizontal as well as vertical axial position, whereby its range of utility is widened. The accessibility of the component parts of this unit is found in the fact that the motor armature and the gearing respectively, can be removed independently of each other in axial direction from a common cylindrical or substantially barrel shaped housing, enabling all parts to be readily inspected, and assembled.

The basic feature which accomplishes these ends, resides in the arrangement of the cylindrical housing which embraces both the motor and the gear, and which immediately makes possible the incorporation of various other desirable component features.

In a preferred embodiment, the housing of the unit has intermediate its ends an integral partition or septum to serve as a bearing support common to the associated or adjacent ends of the driving and of the driven shaft, while the opposed ends of said shafts find their bearing in end-plates or portions which form the closure pieces for the housing or barrel.

The housing with its end-plates assumes the shape of a closed barrel which is provided at its ends with lugs or legs by which the unit, when used in a horizontal position, may be anchored upon its foundation. This allows exterior forces upon the driven or secondary shaft to be securely taken up by the bulk of the housing and in a manner to subdue vibrations. This means that the contour of the plain cylindrical or barrel like housing unit shows substantially no axially overhanging portions to set up vibrations or to put undue stress upon the foundation. Such vibrations are liable to be set up where reduction gears are attached as an overhanging extension to one end of the housing of standard electro-motors, such as are disclosed in prior practice. With the present change however, in the shape of the motor housing, the points of support or legs are placed farther apart from each other, thus furnishing a broader base, and incidentally a proper or better rooting of the driven or secondary part of the drive within the bulk of the unit, although the axial length and compactness of the device is kept to a minimum, as will be understood from the detailed part of the specification.

The driven part of the gearing which is secured to the driven shaft or stub, includes a conventional rotary cage for the planetary gears. With the present novel construction of the housing, the cage reaches well into the bulk of the housing and into close proximity to the adjacent armature. It tends to reach far enough (towards and into the central hollow of the armature) back into the housing to offer an effective and sufficient base of resistance or base of transmission upon the housing of transverse external forces exerted upon the driven shaft during operation.

In some cases of operation a drive unit as herein characterized, may be subjected to severe reactions when transverse or thrust stresses are sent back from the cantilever of the driven shaft to the associated gear cage and its bearings. The new solidly anchored integral cylindrical or barrel-like shape of the unit is well fitted to take up such strain, but supplementally there has been devised a bearing arrangement for the heavily taxed gear cage. Principally, of course, it is understood that with increased ratio the absolute amount of stress upon the secondary shaft or the gear cage grows as the increase in ratio. It is also clear that similar devices not having an efficient rugged base in the form of the present cylindrical housing, can not particularly benefit from a similar bearing improvement because otherwise their whole bulk is not fitted for such stress, metaphorically speaking the knife blade would be better than its handle.

Therefore, according to one feature of this invention, the gear cage is fitted with a set of two opposed conical roller bearings of known construction, which allow close adjustment of the bearing seats for the gear cage so as to render the rotation of the burdened element relatively immune from the effects of universal stresses, shocks, and wear; which makes for greater durability under heavy duty operation; and checks the reaction of forces into the associated driving parts. Since the bearings must be axially adjusted, there is provided an auxiliary arrangement or coverplate upon the end of the housing, concentrically fitting in with the general concentric and telescoping arrangement of the housing and its associated parts.

The advantage offered by the design of the barrel-shaped housing is further accentuated where a higher ratio of speed reduction is desired. In such case, the housing may be fitted simply by further cylindrical extension to accommodate an additional set or unit of planetary reduction gearing, in series with the first set. This addition widens the base of the unit and thus works to advantage while otherwise it requires practically no additional amount of machining or shop work on the housing.

From a standpoint of economical manufacture the integral cylindrical or barrel-shape requires substantially nothing but concentric borings or facings which can be executed economically and readily on the cylindrical casting with insurance of perfect axial alignment of the motor and gear appuretenances. It can therefore also be said that the cylindrical housing constitutes a new and useful article of manufacture.

Summarizing the main feature of the invention lies in the peculiar development of a substantially barrel shaped motor housing for both the motor and the associated planetary reduction gearing, with respect to mechanical stresses, compactness, adaptability, accessibility, simplicity, and cheapness. And this design of housing with its septum presents advantages with regard to manufacture and to standardization. Moreover, in this type of construction, the speed reducing gears can be totally submerged in oil.

Another feature lies in the arrangement of parts which fit into the housing by coaxial concentric mounting which makes possible the telescoping into each other, of parts for greatest compactness. Still another feature relates to the air cooling of the septum between the motor and its gear compartment. This is accomplished by arranging the inlet for the cooling air for the motor armature at a point intermediate the ends of the barrel-shaped housing and adjacent to the motor side of the septum. In this way it is possible to cool effectively the armature as well as the interiorly located septum and the bearings therein. A preferred arrangement of the air channels allows the incoming cool air to impinge upon the bearing portions as the air is deflected into the interior of the armature.

The invention possesses other objects and features of advantage some of which, with the foregoing will be set forth in the following description of the invention. In the accompanying drawings, I have illustrated the best embodiment of my invention known to me, but such embodiment is to be regarded as typical only of many possible embodiments and my invention is not limited thereto.

The invention will be more clearly understood from the following description and the appended drawings in which Fig. 1 shows a part sectional view of a motor and reduction gear unit.

Fig. 2 is a view similar to Fig. 1, with the gear disassembled from the motor to show the manner of axially dismantling the unit.

Fig. 3 shows an adaptation of the unit for the purpose of vertical drive.

Figure 1:
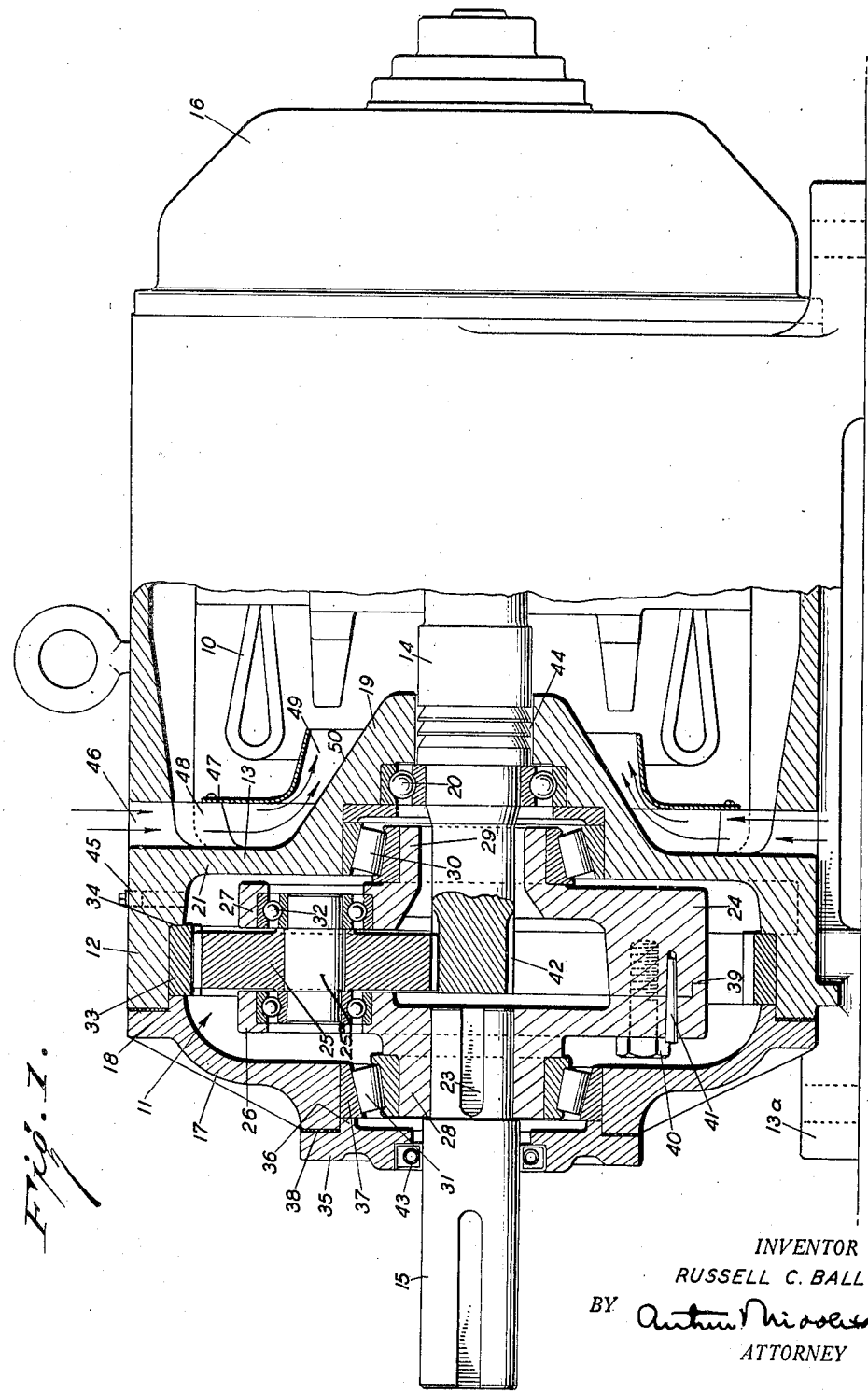

The unit as shown in Fig. 1 includes broadly an electro-motor indicated by the armature 10, and an associated reduction gear of the planetary type collectively indicated by the numeral 11. The motor and the reduction gear are coaxially arranged in a substantially barrel-shaped or cylindrical housing 12 in which a partition or septum 13 defines the chambers or compartments which accommodate the motor and the gear mechanism, respectively. Legs 13a shown to be cast integral with the cylindrical housing 12 at each end thereof permit the unit to be anchored down upon a base. The armature includes a shaft 14 which will be called the driving or primary shaft. The reduction gear comprises a stubshaft 15 coaxial with the primary shaft and which will hereinafter be called the secondary or driven shaft. The other or opposed ends of said shafts are carried by antifriction bearings such as roller or ball bearings in endplates 16 and 17, shown at the right and the left hand side, respectively, (Fig. 1), which form the closure pieces for the open ends of the barrel-shaped housing. The front plate has a shoulder or flange 18 by which it fits to the housing. The outer end of the drive shaft is thus carried in the end plate 16, while its inner end is mounted in the hub-shaped portion 19 of the septum where it finds its seat upon a ball bearing 20 fitted into a recess within said hub. The details in the arrangement of the septum should be noted. The septum comprises a wall 21 preferably shown to be integral with the cylindrical housing. From the wall extends the central hub-portion 19 with the outer contour of a truncated cone which has a hollow in the form of a succession of circular recesses stepped down in conformity with the taper of the cone.

The speed reducing mechanism of the unit comprises the secondary or stub shaft 15 which is shown to be suitably fixed, as by groove and key connection 23, to a conventional gear cage 24. The gear cage has mounted therein a plurality of the so-called planetary gears 25. The gear cage is here shown to be separable into two halves, that is a left half 26 and a right half 27. When assembled, the cage forms a central body portion which carries the planetary gears. As a rule three such gears are provided in triangular, that is to say balanced, arrangement relative to a central driving pinion upon the primary shaft. Each half of the cage is formed with a hub portion 28 and 29 respectively, carried in bearings 30 and 31 which are of preferred conical roller type. The rear bearing 30 of the gear cage 24 is seated in the hub-shaped portion of the septum and is located adjacent to the ball bearing 20 so that the septum serves to carry the associated or abutting ends of the primary and the secondary shafts. The planetary gears are shown to be provided with customary ball bearings 32 in the cage, and are arranged to mesh with a surrounding internal gear 33 which is fitted and seated in a recess in the housing as at 34.

The front hub-portion 28 of the gear cage 24 is supported in the conical roller bearing 31 fitted into the endplate 17 and held in place by an auxiliary coverplate 35 adapted to close the central opening in the endplate. This coverplate has a shoulder or flange 36 engaging upon the outer race 37 of the adjacent conical roller bearing 31. By proper shimming as at 38, this will hold the adjacent conical roller bearing 31 as well as the corresponding opposed conical roller bearing 30 of the gear cage, in proper operative position. The two halves 26 and 27 of the gear cage are fitted together by circular shoulder or flange and recess as at 39, and held together as by screws 40. Tapered dowel pins 41 connecting the two halves of the gear cage 24 are to insure the proper relative position thereof as well as the transmission of the torque stresses. The free end of the primary or armature shaft 14 is shown to have cut therein, a spur gear or teeth 42 adapted to mesh in the conventional manner with the planetary gears 25.

An oil seal for the gear compartment is indicated at 43 for the secondary shaft, and at 44 for the primary shaft. An oil inlet for the gear compartment is shown at 45.

At 46 are indicated air inlet openings in the housing through which the armature draws its cooling air. In order to conduct the cooling air properly through the interior of the armature 10, there is provided a guide baffle 47 mounted upon lugs 48 upon the housing or casting, and forming with the adjacent septum 13 the air channels 49 through which fresh cold air is drawn as indicated by the direction of the arrows therein. It is noted that the radially disposed air channels 49 follow the contour of the septum, curving inwardly towards the armature, and along the conical contour 50 of the hub portion 19 of the septum. This arrangement of air inlets thus serves the additional purpose of cooling the bearings which are located in the hub of the septum, that is to say for cooling the high speed ball bearing 20 of the armature shaft as well as the adjacent roller bearing 30 of the speed reducing mechanism.

Figure 2 shows more clearly the novel manner of independently assembling the parts of the machine, at each side of the septum 13 of the common housing. More specifically, this constitutes the separate assembly of the electrical or motor part comprising the armature 10, and the speed reducing part comprising the reduction gearing 11, of the machine. Merely the reduction gearing 11 is here shown to be removed, whereby it is to be understood that the motor-armature 10 also may be removed independently in a similar manner. his facilitates assembly as well as inspection of either the gear or the motor part of the unit. It is to be noted that by the mere operation of placing the parts in position in the housing, the operative relationship between the primary shaft 14 and the reduction gearing 11 is established, as the teeth of the spur gear 42 on the primary shaft 14 are brought to mesh with those of the surrounding planetary gears 25.

The speed reducing mechanism proper is assembled substantially as shown in Figs. 1 and 2. The cover or bearing plate 17 fixes the position of the stationary internal gear when the cover is bolted onto the housing, and the shoulder or flange 18 engages upon the side of the internal gear 33.

The conical roller bearings 30 and 31, for proper operation and durability of the mechanism are capable of individual adjustment which is furnished by the arrangement of the auxiliary cover plate 35 which incidentally carries the oil seal 43. With the proper use of the shims 38 correct engagement of the shoulder 18 upon the outer race of the adjacent conical roller bearing 31 can be effected, and the front as well as the rear roller bearing of the gear cage 24 be held in accurate working condition upon their seats. Wear in the bearings due to reaction from the secondary or stubshaft 15 can be taken up by adjusting the interposed shims or gasket. The auxiliary cover 35 moreover allows convenient individual inspection of the front bearing.

The combination of a motor with a speed reducer of the planetary gear type is broadly old, so the function of the planetary speed reducer is now merely explained for the sake of completeness.

The spur gear pinion 42 of the armature shaft 14 meshes simultaneously with the surrounding planetary gears 25 which are rotatably mounted in the gear cage 24 which in turn is independently mounted for rotary movement in the housing. The planetary gears also mesh with the internal gear 33 surrounding the same, so that the speed of the primary or armature shaft is reduced, over the bodily moving planetary gears 25 and the stationary internal gear 33, to the desired lower speed of the gear cage or secondary shaft 15 respectively. A practical ratio attained under the prevailing circumstances is approximately 1 to 10.

A modified arrangement of the unit is shown in Fig. 3, which illustrates its universal adaptability or else the capability of this unit to be used with advantage for direct drive of vertical shafting, in which case the unit can be readily placed in a position vertically coaxial with the driven machinery or shaft. To this end, the housing may be constructed in the way of a cylinder 12a of smooth outer contours, while that endplate which faces the reduction gearing is extended to form a stand 51 by which it may be mounted directly upon the top of such machines as thickeners, agitators, flotation machines and others. Such a vertically driven device is indicated in Fig. 3 as by the dot and dash line 52 in Fig. 3.

When the unit is thus mounted in compact vertical arrangement, it offers a minimum of obstruction with regard to the accessibility from the top of the subjacent driven apparatus.

It can be said that the present direct vertical drive arrangement in its compactness displaces older more laborious arrangements of horizontal drive motors and reduction gearing operating through bevel gears upon the vertical shaft of the driven apparatus.

Describing the vertical arrangement of Fig. 3 more in detail, the cylindrical housing 12a is mounted upon the base portion or stand 51 which comprises a skirt 53 having longitudinal reinforcement ribs 54, and a horizontal wall 55 which has a hub 56 into which is fitted a thrust bearing such as a conical roller bearing 57 serving as the front bearing for the gear cage 58. Upon the lower face of the hub 56 there is fitted a stuffing box 59 and fastened as by screws 60, and it has a gland 61 and a packing 62, serving as a seal for the oil in the gear chamber 63. It is noted that the gear chamber is downwardly extended, furnishing a larger oil reservoir, and making possible a wider spacing between the outer bearing 57 and the corresponding inner bearing 64 of the gear cage 58. The stand 51 thus serves a manifold purpose.

In cases where higher ratios are desired than those obtainable in a simple set of planetary gears, this general arrangement of a drive and speed reducing unit lends itself well for the provision of a plurality of sets of planetary gearings in series. This means but that the barrel-shaped or cylindrical housing need only be longitudinally extended in order to accommodate a second or even a third set of planetary gears in series in axial alignment with the first set. The extension of the housing thus made necessary serves to further widen the base of resistance of the unit against the increased absolute stresses such as may be exerted transversely upon the secondary, or upon the tertiary shaft. A practical ratio attained with this enlarged unit is about 60 to 1.

Figure 4:
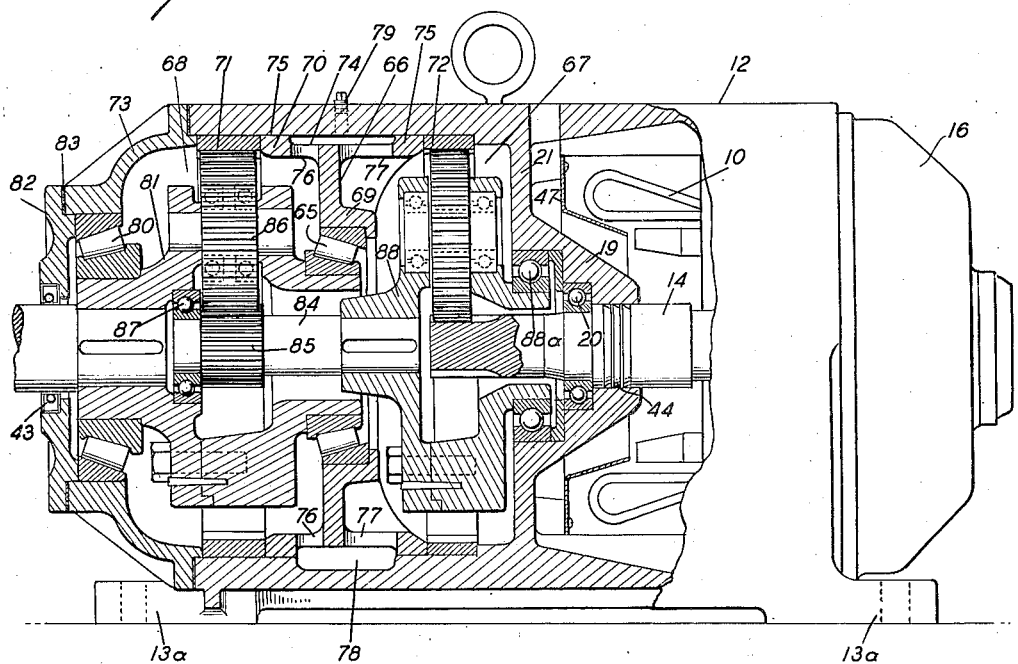
Fig. 4 shows the housing of the unit extended to accommodate a series arrangement of a plurality of reduction gears.

The details of this modification are shown in Fig. 4. The adaptation consists in extending the cylindrical gear chamber as illustrated and providing an additional intermediate bearing 65, and an auxiliary annular bearing support 66 which forms an individual element and can be fitted into the smooth inside of the cylinder. The intermediate bearing is interposed between the first stage reduction gear 67 and the second stage reduction gear 68.

The particular importance and peculiar shape of the auxiliary support in this enlarged unit should be noted. This annular member has a substantially T-shaped profile. An inner hub-shaped portion 69 accommodates the intermediate bearing 65, while an outer cylindrical portion 70 fitted into the cylindrical housing, furnishes ample guidance and an ample base for the intermediate support within the housing. Further, this intermediate supporting member also serves as a spacing member for internal gears 71 and 72 so that all stationary parts fitted into the housing can be held in fixed position by the pressure of a cover or bearing plate 73 suitably fastened upon the end of the housing, (for instance by bolts not shown).

In the practical embodiment shown, this intermediate bearing member is preferably in the form of a casting cored out in suitable places. One circumferential depression is shown at 74, leaving faces 75 at the extreme ends for proper fit into the smooth inside of the housing. Openings are indicated at 76 and 77. At the bottom these openings cooperate with a depression or groove 78 in the wall of the housing, allowing for oil communication between the first and the second stage section of the gear compartment. An oil inlet is shown at 79.

The proper relationship of the moving parts, such as the intermediate bearing 65, and the front bearing 80 of a gear cage 81 with the stationary parts, is again preserved by an auxiliary cover portion 82 which when properly mounted such as with aid of shims 83 or the like, holds the conical roller bearings 65 and 80 of the gear cage in adjusted position. The cooperation of the first stage gear 67 and the second stage gear 68 is secured as shaft 84 of the first gear reaches into the gear cage 81 of the secondary gear where the spur gear 85 meshes with the planetary gears 86 in the usual manner, and a ball bearing 87 guides the rotation of the first shaft telescopically within the second gear cage 81.

Thus the rotation of the second cage is securely guided in its respective conical roller bearings and bearing supports, thereby furnishing in turn a suitable positive bearing support for the associated ball bearing 87 of the first shaft or gear cage 88. Since axial forces from the driven end are intercepted by the conical roller bearings 65 and 80, the inner end of the first gear cage 88 needs but a plain ball bearing 88a for support.

Figure 5:
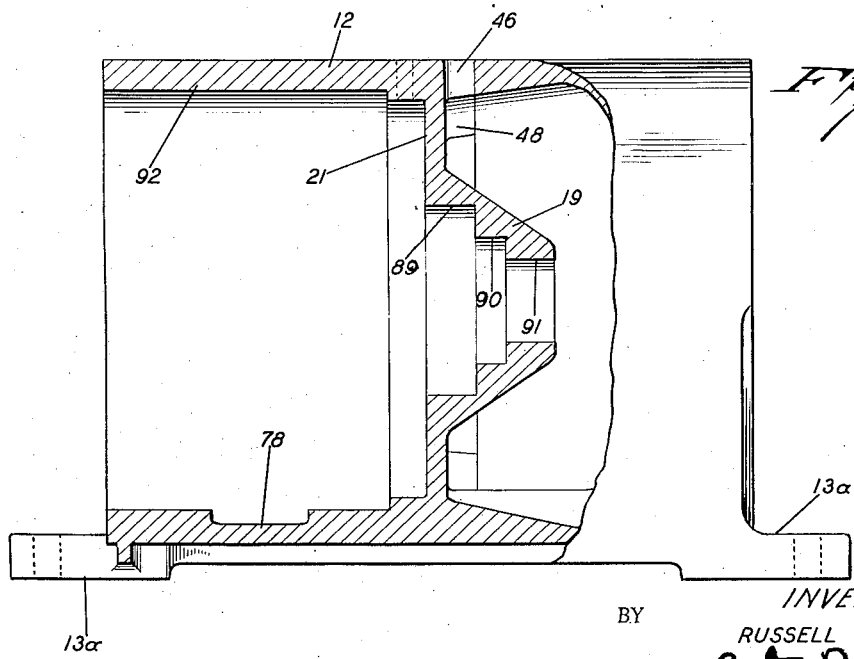
Fig. 5 shows the cylindrical housing and septum therein.

In view of the fact that the simple barrel-shaped or cylindrical housing of the unit with its peculiar septum construction forms the backbone of this invention, Fig. 5 illustrates that housing in one preferred form and stripped of all parts which in the course of assembly are mounted axially into each of its chambers. This housing thus constitutes an article of manufacture which may be made in one solid casting, which is of simple substantially cylindrical shape, and the concentric bores of which can be readily machined, insuring proper fit of all the component parts, at low manufacturing cost. The housing consists of the cylindrical wall 12, the septum 21, legs 13a. The figure shows clearly the truncated cone shape of the hub portion 19 of the septum, and the succession of stepped recesses or boxes 89, 90 and 91 in the hub portion. The bores are made to fit bearings such as 30 and 20 Fig. 1, and for instance the oil seal 44 upon shaft 14 Fig. 1, respectively. A bore 92 is made to fit the gear appurtenances.

After the unit is assembled in the manner described and shown in Fig. 2, the operation is as follows.

The high speed rotation of the armature shaft 14 is converted into a desired low speed movement of the secondary shaft 15, by having the pinion 42 of the armature shaft engage with the surrounding planetary gears 25 and the planetary gears in turn engage with internal gear 33 encompassing the same. The gear cage 24 and the secondary shaft connected therewith is thus caused to rotate at a reduced speed, whereby the ratio depends upon the proportion of diameters of the pinion 42 and the planetary gears 25.

I claim:

1. In a power unit, an electro-motor, a driving shaft impelled by said motor, a co-axial driven shaft, a speed reduction gearing for said driven shaft of the planetary type having a rotary gear carrying planetary gears, a unitary housing for accommodating said motor and said gearing, a bearing supporting hub fixed within and integral with said housing extending into said motor, an endplate for the gear end of the housing, opposed tapered roller bearings mounted in said bearing support and in said endplate respectively, said roller bearings adapted to operatively support said gear cage, and an auxiliary cover upon said endplate adapted to retain said gear cage and its tapered roller bearings in correct operating relationship with the surrounding stationary parts of the housing.

2. In a power unit, an electro-motor, a driving shaft impelled by said motor, a co-axial driven shaft, a speed reduction gearing of planetary type for said driven shaft, an integral substantially cylindrical housing adapted to accommodate the motor as well as the gearing, a septum integral with said housing for separating in an oil tight manner said motor from said gearing, bearing portions for the shafts to form end closures for said cylindrical housing, and a substantially circular stand associated with the unit for vertically mounting the same.

3. A unit according to claim 2 in which said stand is truncated cone-like in formation and is associated with one of said bearing portions.

4. In a power unit having an electro-motor provided with an armature, a driving shaft impelled by said motor, a driven shaft coaxial with said driving shaft, a speed reduction gearing deriving power from said driving shaft and impelling said driven shaft, a unitary casing for said parts, an integral septum extending across said casing separating said motor from said gearing in an oil-tight manner, an integral hub on said septum extending into the plane of said motor armature forming a common bearing support for the driving shaft and the speed reduction gearing, and pairs of legs for said unitary casing with one pair extending beyond the vertical plane of said gearing with respect to said motor and the other pair being adjacent to the opposite end of the motor from the gearing whereby unsupported overhanging parts of the power unit are avoided.

RUSSELL C. BALL.